Sept. 4, 1928.

E. R. DEARING

METAL PLUG FOR PIPE JOINTS

Filed Dec. 27, 1927

Inventor
E. R. Dearing
By
Attorney

Patented Sept. 4, 1928.

1,682,741

UNITED STATES PATENT OFFICE.

EDMUND R. DEARING, OF BIRMINGHAM, ALABAMA.

METAL PLUG FOR PIPE JOINTS.

Application filed December 27, 1927. Serial No. 242,820.

My invention relates to improvements in metal pipe plugs for bell and spigot ends of pipe and pipe fittings as used for conveying water or gas under high pressure. The joints in the ends of such pipe and fittings for which this plug is intended are made with jute yarn and lead which is poured, calked or driven down in the bell around the wall of the pipe, making a pressure tight joint.

One of the objects of my invention is to provide a plug of the character designated which shall be simple of design and easy of manufacture, capable of withstanding relatively high pressure and which may be readily applied and removed from a pipe end without necessity of melting the lead from around the joint.

A further object of my invention is to provide a plug of the character designated which may be readily applied and removed and in which the parts are protected from corrosion and earth packing when left in the ground for long periods of time, whereby the plug may be readily removed from the end of the pipe.

The improvements in the plug covered by this invention, compared to the type now commonly used, are that, although the new plug may have what is known to the trade as a beaded end, the lead and jute can be removed from around the plug in the bell without the aid of heat, as hereafter explained, and in a fraction of the time now required.

Apparatus embodying features of my invention is illustrated in the accompanying drawing, forming a part of this application, wherein Fig. 1 is a sectional view through the bell end of a pipe and showing my improved plug in position;

Figure 1:
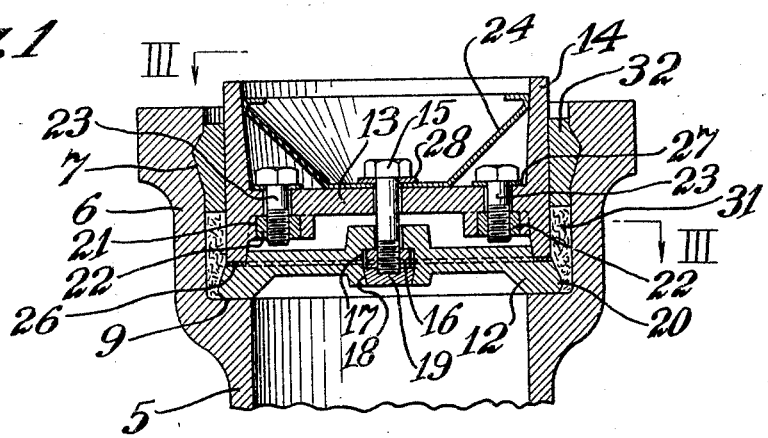

Referring now to the drawing I show a fragment of a pipe 5 having a bell end 6, terminating at its inner end in an annular shoulder 9 and closed to resist high internal pressure by means of my improved plug. Toward the outer end of the bell, as is usual, is an annular groove 7 which serves to hold the packing in place which is used in connecting pipe sections and, as will appear later, to hold the packing employed with my improved plug. The plug comprises a plate or disk 12 resting on the annular shoulder 9 forming the bottom of the bell 6. The disk 12 also serves as a support to jack against when removing the plug, as will be described later. Above the plate 12, as seen in the drawing, is a disk or plate 13 enclosed by a cylindrical wall member 14, the disk 13 and plate 12 being joined, when assembled, by a machine bolt 15 and a nut 16 on the lower end of the bolt. The nut 16 for the bolt 15 is held in place in a recess 17 formed on the lower side of the plate 12. The sides of the recess 17 are tapered at 18 to allow a lead plug 19 to be calked in place forming a water or gas tight joint to prevent rusting of the nut 16 and also to prevent leakage thereby.

The disk 12 is formed with a bead 20, larger in diameter than the cylindrical wall 14 of the disk 13 and which, when the plug is in place and properly packed, cooperates with the packing in the annular groove 7 to form an interlock which renders the plug capable of withstanding high internal pressure in the pipe 5.

In the lower side of the disk 13 are a plurality of recesses 21, only two being shown and the number depending upon the diameter of the plug. Positioned within the recesses 21 are nuts 22, said nuts being made of non-corrosive metal and normally receiving plug bolts 23 to keep the threads in the nuts clean. The heads of the bolts 23 are protected against corrosion and against earth filling between them and causing obstruction to the use of a wrench thereon, by a cover 24 which is held in place by the bolt 15. Between the plate 12 and the cylindrical wall 14 is a lead gasket 26 making a fluid tight joint. As a further protection against leakage, lead washers 27 and 28 are used under the heads of the bolts 23 and 15 respectively.

The plug, assembled as shown in Fig. 1, is usually applied to the end of a pipe in the following manner:—The plug is first inserted in the bell end of the pipe and a quantity of jute or yarn 31 is inserted and calked or driven firmly in place around the plug. A lead ring 32 is next formed around the plug by pouring molten lead around the space between the wall 14 and the wall of the pipe and, when solidified, is calked or tamped down into the bell end of the pipe. When thus packed, the bead 20 and annular groove 7 cooperate with the packing to form an interlock to make a joint capable of withstanding relatively high pressure.

As is well understood in the art, such plugs are usually applied to the ends of pipes leading from service mains for water or gas and to which a connection is to be made later. After being applied, the pipe is covered with earth and may so remain for a long period of time. It will be appreciated that my improved plug, protected as its parts are from corrosion and earth packing, is readily accessible for removal whenever desired and when the earth covering has been removed from the pipe.

Whenever it is desired to remove the plug from the end of the pipe after being calked in place, as previously described, the bolt 15 and cover 24 are first removed and then the bolts 23, leaving the nuts 22 in place in the recesses 21. A bolt 36, longer than the bolts 23, is next inserted and screwed through each of the nuts 22, and down against the plate 12. These bolts 36 serve as forcing or jack screws to force the disk 13 of the plug away from the plate 12 and free the wall 14 from the packing. Ordinarily, the bolts 36 are not a part of the assembled plug because of their length and they are usually carried as a part of the tool equipment of the workman.

Figure 2:
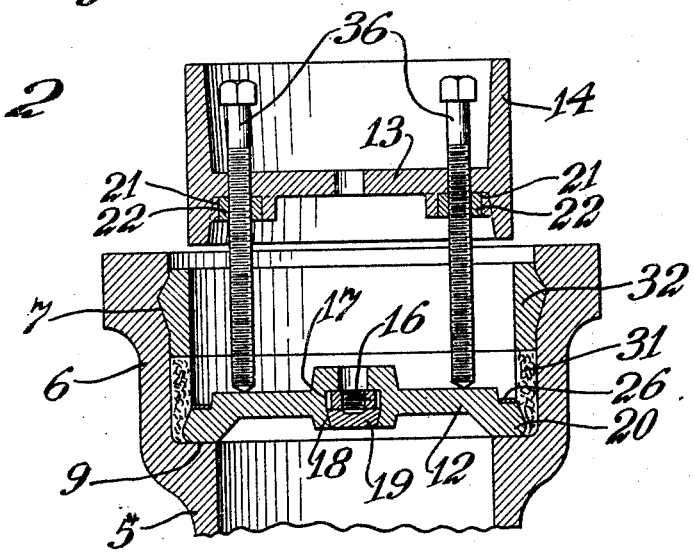
Fig. 2 is a view similar to Fig. 1 and showing the plug being removed.
Figure 3:
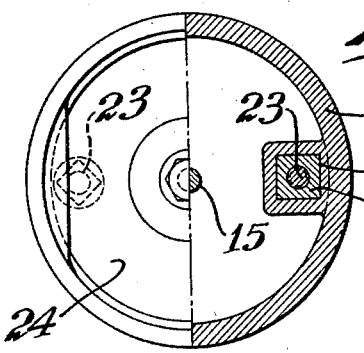
Fig. 3 is a sectional view taken along the line III—III of Fig. 1.

When all of the forcing bolts or jack screws 36 are in place, they are screwed down the same distance against the plate 12 until the disk 13 is forced out of the bell end of the pipe 10, freeing the cylindrical wall 14, as shown in Fig. 2. The lead ring 32 is then exposed where it may be readily cut with a chisel on opposite sides thereof and removed. The jute yarn 31 may then be pulled out and the plate 12 removed. In removing plugs used for the same purpose in the prior art, with which I am familiar, it has been necessary to heat the lead ring 32 until it is melted out, making an uncertain laborious process.

From the foregoing it will be apparent that I have devised an improved pipe plug, simple of design and easy of manufacture, and which may be readily assembled and disassembled.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. A plug for closing the bell end of a pipe having an internal annular shoulder, comprising a disk member seated on the shoulder, a cylindrical member normally positioned adjacent the disk member toward the outer end of the bell, a transverse member extending across the cylindrical member and having a plurality of openings carrying internally threaded members to coact with forcing screws to separate the cylindrical member and the disk member when desired, and a metallic ring of joint forming material between the cylindrical member and the wall of the pipe and tightly engaging said member and said wall.

2. A plug for the bell end of a pipe, comprising a disk member positioned at the inner end of the bell, a cylindrical member having a transverse wall mounted adjacent to said disk member, said wall being provided with a plurality of openings, a packing ring between the cylindrical member and the interior of the pipe and tightly tamped in place, internally threaded means in the openings of the transverse wall to cooperate with jack screws in separating said members and removing the plug from the pipe, and means for preventing leakage between the members when assembled.

3. A device as set forth in claim 2 wherein the means for preventing leakage between the members comprises a gasket interposed between said members and a bolt adapted to draw the members together when assembled.

4. A plug for the bell end of a pipe, comprising a disk member positioned at the inner end of the bell, a cylindrical member having a transverse wall mounted adjacent to the disk member, said wall being provided with a plurality of openings, a packing ring between the cylindrical member and the interior of the pipe and tightly tamped in place, internally threaded means in the openings of the transverse wall to cooperate with jack screws in separating said members and removing the plug from the pipe, a gasket between the disk member and the cylindrical member, a bolt for drawing the members together and against the gasket to prevent leakage therebetween, and a cover fitting against the transverse wall of the cylindrical member and held in place by the bolt.

5. A plug for the bell end of a pipe having an internal annular groove near the outer end thereof, comprising a disk member positioned at the inner end of the bell, a cylindrical member smaller in diameter than the disk member and mounted adjacent the disk member and opposite the annular groove, packing means surrounding the cylindrical member and disk member, a transverse wall extending across the cylindrical member and having a plurality of openings therein carrying threaded members for co-operating with forcing screws in removing the cylindrical member, means normally closing the openings against leakage, a bolt normally joining the transverse wall to the disk member, packing means cooperating with the bolt to prevent leakage, and a cover for the plug and held in place by the bolt.

In testimony whereof I, EDMUND R. DEARING, affix my signature.

EDMUND R. DEARING.